May 2, 1944.   D. W. ROSS   2,347,968
METHOD OF MAKING MAGNESIAN REFRACTORIES
Filed April 16, 1943    2 Sheets-Sheet 1

Fig.1.

INVENTOR
Donald W. Ross
By Archworth Martin
His Attorney

May 2, 1944.   D. W. ROSS   2,347,968
METHOD OF MAKING MAGNESIAN REFRACTORIES
Filed April 16, 1943   2 Sheets-Sheet 2

Fig. 2.

INVENTOR
Donald W. Ross
By Archworth Martin
His Attorney

Patented May 2, 1944

2,347,968

UNITED STATES PATENT OFFICE 2,347,968

METHOD OF MAKING MAGNESIAN REFRACTORIES

Donald W. Ross, Hyattsville, Md.

Application April 16, 1943, Serial No. 483,279

17 Claims. (Cl. 25—157)

My invention relates to a process of making refractories, and more particularly to the bonding of the materials in a refractory body, and constitutes a continuation in part of my application Serial No. 345,428, filed July 13, 1940 (Patent 2,331,232), the present application being directed more particularly to the forming of magnesian refractory ware, although the claims are not all limited to such refractories. While magnesia bricks have heretofore been made, they have not been sufficiently strong to long withstand open hearth crown temperatures. Magnesia bricks bonded as hereinafter explained have such great strength that they can be employed in the crowns of open hearth furnaces and the operating temperatures increased to approximately 1900° C. instead of the usual limit of 1595° C. permissible with silica brick. Faster melting and saving of time is therefore possible when applicant's improved magnesia brick is employed.

In bonding of refractory materials, it is desirable that they be self-bonded, or that the bonding material be (1) sufficiently refractory; (2) resistant to chemical action under heat and slags, and (3) resistant to thermal shock, that the so bonded refractory will not fail because of the bond.

The bonds of refractories commonly consist of: (1) interlocking crystals of the refractory materials themselves or crystals of other refractory materials, or both, and (2) interstitial glass formed from the refractory materials themselves or from other refractory materials and impurities, or both. Such other (auxiliary) refractory materials sometimes occur naturally associated with the principal material, and at other times must be added to it.

The strength and life of a refractory body depends largely upon the qualities of the bond. Heretofore in the manufacture of refractories from the common refractory materials, the acid-forming elements have proven useless as "bond developers" for the reason that the acid element has been permitted to escape from, and cease to be in contact with, the refractory material, at temperatures at which it should be acting as bond developer.

Invariably the acid-containing compounds heretofore used have been those which are readily hydrolized or are the end-products of such hydrolysis. This fact has prevented their being of use as bond developers.

Present day kiln gases contain water vapor, which is a hydrolyzing agent of the compounds of the common refractory materials with the acid-forming elements. The result of such hydrolysis is an oxide of the refractory constituent of the compound and a hydrogenated compound of the acid-forming element. The result of this decomposition has been to produce a friable condition in the refractory composition instead of bonding the refractory grains together.

One object of my invention is to provide a method of developing bonds of superior quality, in refractory materials.

Another object of my invention is to provide a method whereby hydrolysis is prevented, in the compounds of the common refractory materials with the acid-forming elements.

Another object of my invention is to provide a method of so bonding silica and siliceous materials as to reduce their porosity and thermal expansion, and to increase their resistance to thermal shock.

A further object of my invention is to bond magnesia in such manner that it will resist deformation under heat and load and be resistant to heat shock, slags and penetration by iron oxide.

The term "refractories" as used herein refers to the common refractory materials such as silica and silicates, alumina and aluminous materials, magnesia, magnesite and forsterite refractories, chromic oxide, chrome (the chrome ore used in chrome refractories) and chromite refractories.

The term "bond developers" refers to the acid-forming elements, that is to the typical acid-forming elements of groups V, VI and VII of the periodic table of elements; namely, sulfur, selenium, tellurium, the halogens (fluorine, chlorine bromine, iodine), phosphorous, boron, boron oxide, carbon, nitrogen, arsenic and antimony.

Under heat and in the absence of hydrolysis, all the acid-forming elements (bond developers) enumerated above, form compounds with any of the common refractory materials and with the metallic elements of the refractory materials, and these acid-forming elements combine with one another and with ammonia. Hence, in performing their useful function, these acid-forming elements can be present as compounds with one another and of the refractory and auxiliary refractory materials, and in compounds with ammonia, be in solid solution, and possibly be present in mixtures. After serving their useful purpose of developing bond during the firing of a refractory body, they may be eliminated from the refractory or be maintained therein, as desired. For my purpose of developing bond in refractory materials, it is sufficient if only a small percentage of the refractory material is combined with an acid-forming element at any one time.

This invention, therefore, includes the preventing, during at least part of the firing operation, of hydrolysis of the compounds of the common refractory materials with the acid-forming elements, and means of accomplishing the same.

A principle which I apply for prevention of hydrolysis during firing, comprises use of the law of mass action. For this purpose I use suitable solid, liquid and gaseous substances. These are here desigated as "retaining agents." One aid in applying this mass action principle comprises providing non-hydrolyzing atmospheres in and surrounding the refractory during at least part of the processing period. Since the reactions herein concerned take place within the refractory, I may place the atmosphere-forming material either in or surrounding the refractory, or both in and surrounding it. Thus, in some cases, it may not be necessary to maintain high concentrations of the bond developing agents in the kiln chamber atmosphere. In cases in which special atmospheres are provided as retaining agents in the kiln, such atmospheres and partial pressures of atmospheres include (1) ammonia, carbon and silicon compounds of the respective acid-forming elements; (2) nitrogen, carbon, carbon monoxide, and the inert gases including helium, neon and argon, all in substantial absence of water vapor.

Hydrolysis of the refractory acid-forming compounds will not take place in the presence of suitable concentrations of the corresponding acid-forming radical (ion). For instance, damp magnesium chloride is hydrolized to magnesium oxide and hydrochloric acid, upon being heated in air. If, however, ammonium chloride be mixed with the magnesium chloride, the mixture not only can be dried without decomposition, but at higher temperatures the ammonium chloride can be volatilized off and the magnesium chloride melted as such. This prevention of decomposition during drying and firing results from the presence of the readily available mass of chlorine radical or ion of the ammonium chloride. Such common ion relation is, hence, one in which an acid element refractory compound is accompanied by an additional amount of the same acid element radial (common ion), supplied from a suitable compound containing it. The presence of the additional amount of the common ion serves to prevent decomposition of the acid element refractory compound. This common ion relation also exists between magnesium fluoride and ammonium fluoride. For this purpose I may use the magnesium ammonium fluorides, $MgF_3NH_4$ and $MgF_2(NH_4)_2$.

Furthermore, on being heated in the presence of the acid-forming elements hereof, the refractory oxide grains are attacked, thereby forming the respective acid-element refractory compound.

My use of bond-developing and retaining agents is hence to attack the surface of the refractory grains only to an extent sufficient for bonding purposes and then to prevent the decomposition of this acid-element refractory compound and the retaining agents until they have performed their useful function.

In so attacking the surface of refractory grains, I may prefer to have present sufficient other glassy bond so that as the acid element is dissipated or eliminated, the refractory oxide left behind dissolved in said glassy bond may remain as glass or may crystallize as a framework throughout the bond, instead of being present as dry powder crystals, which might disrupt the formed refractory ware. In addition to ammonia compounds of my acid-forming elements, their non-oxygen compounds with carbon and with each other serve as retaining agents; examples being carbon tetrachloride, carbon tetrafluoride and carbon disulfide.

Heretofore, accessory bonding ingredients have commonly been depended upon to develop the bond as well as to serve as bond, and have, hence, usually been present in the completed refractory in greater than the permissible optimum amount, thus lessening the value of the refractory for its intended use. My use of special bond developers in conjunction with accessory bonds, permits the presence of the optimum amounts of accessory bonds in completed refractories. The presence of small percentages of silicates is particularly advantageous in the development of bonds in refractories. A possible explanation of the advantage of the presence of glassy bond is that at the time that the acid-element refractory compounds recompose, the refractory components are in a chemically reactive (nascent) condition and can readily dissolve in and crystallize from glassy bond, whereas if no glassy bond be present, the refractory components merely form masses of oxide throughout the body and are thereafter inert to solution and recrystallization.

In performing my process I may prefer to use a control substance (retaining agent) to the point at which the water of plasticity, hygroscopic moisture, and chemical and other waters which escape at relatively low temperatures, have been eliminated from the refractory. Such water can commonly be eliminated at temperatures of 121° C. to 204° C. Furthermore, in firing of my refractory compositions, water and other oxidizing substances are also released at relatively high temperatures. Thus chemically combined water may be released from clay-like substances at from 500° C. to 700° C., and the oxygen of iron compounds is variously released above approximately 700° C. I may thus prefer to maintain or retain the atmospheres hereof as need be to meet these conditions.

The bond developers recited herein serve to develop both crystalline and glassy bond and serve other useful purposes. An instance of their unique usefulness is as follows. In the manufacture of refractories from granular material, it is common practice to use any particle size grading that the machinery at hand produces from the materials being processed. Insofar as such gradings have not been compact, with their particles interfitting closely, relatively high furnace temperatures have been resorted to, to soften the particles, so that they would draw together. It so happens that certain refractory materials, such as periclase and corundum, are so refractory and resistant to the usual chemical reactions in kilns that their particles do not soften and coalesce at usual present day kiln temperatures, with the result that the wares so made are inferior. My method of bond developing, although of general usefulness in bonding of refractory grains, is uniquely useful in bonding of the above resistant grains. The bond developers (acid-forming elements) attack such resistant grains under heat, particularly at corners and edges of grains bringing such material into solution in the glassy matrix, where it may remain or from which it may crystallize by subsequent release from the bond developer. This permits the resistant grains to fit more closely together. Thus, in the production of a refractory from such resistant grains, I may prefer to size grade the resistant grains as per the formula $y=x^3$ of my Patent No. 2,297,169, and to fire ware made of them in the presence of my bond developers.

As further illustrative of the $y=x^3$ formula, I have prepared additional charts, as shown in the accompanying drawings, wherein.

Figure 1:
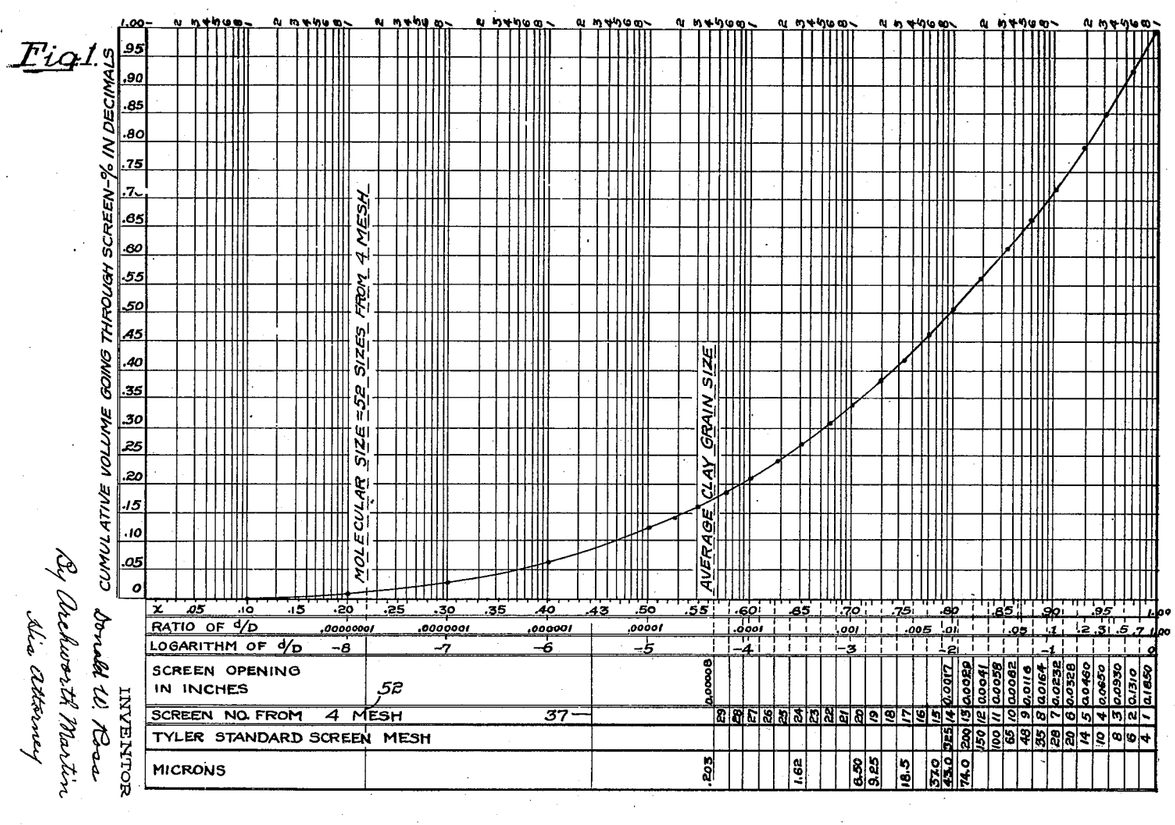
Fig. 1 is a chart illustrative of the $y=x^3$ formula.

The exactness of fit of the approximate geometric progression equation $$S = 0.46980 \frac{(1-r^n)}{1-4}$$

is presented, in which S=cumulative percentage on screens coarser than any given screen, when the maximum sized particle is 4 mesh (.185 inch opening), $r=0.96$ and $n=$the number of screens from the coarsest. It is commonly known (or assumed) that molecular size is 52 screens from the 6 mesh size. The data follow:

*Percentages on screen*

| No. of screens from 4 mesh | Per $y=x^3$ | Per $S=0.4698\frac{(1-0.96n)}{1-0.96}$ |
|---|---|---|
| 6 (28 mesh) | 25 | 25.51 |
| 12 (200 mesh) | 45 | 45.48 |
| 25 | 75.9 | 75.12 |
| 27 | 79 | 78.44 |
| 52 | 99.0 | 103.00 |

Figure 2:
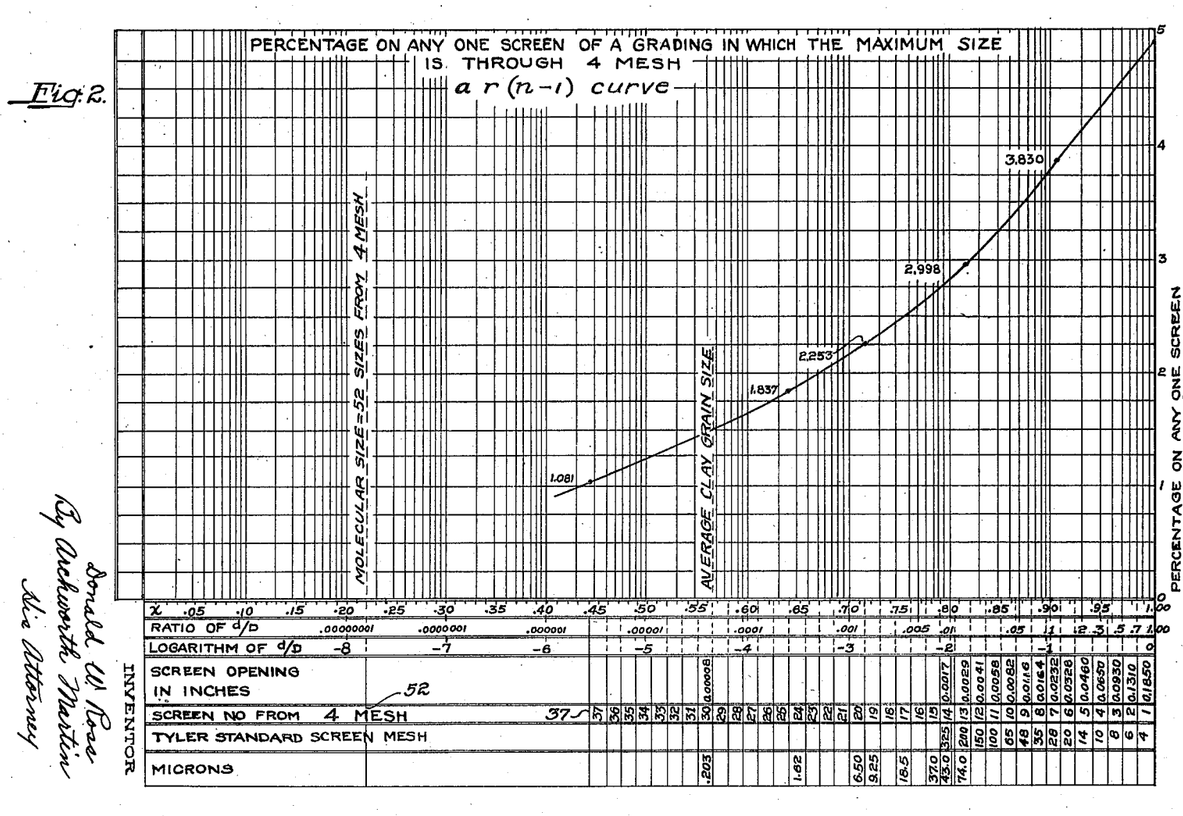
Fig. 2 is a chart showing a manner in which the $y=x^3$ curve can be utilized.

As additional help for use of the $y=x^3$ curve, the geometric progression $ar(n-1)$ is shown in Fig. 2, in which $a=0.046980$ and $r=0.96$. According to this formula the amount on each of the following screens is as shown.

| No. of screens from 4 mesh | Standard screen-scale mesh | Percentage on one screen |
|---|---|---|
| 1 | 6 | 04.6980 |
| 2 | 8 | 4.510 |
| 3 | 10 | 4.329 |
| 4 | 14 | 4.156 |
| 5 | 20 | 3.990 |
| 6 | 28 | 3.830 |
| 7 | 35 | 3.677 |
| 8 | 48 | 3.530 |
| 9 | 65 | 3.339 |
| 10 | 100 | 3.253 |
| 11 | 150 | 3.123 |
| 12 | 200 | 2.998 |
| 19 | | 2.253 |
| 24 | | 1.837 |
| 37 | | 1.081 |

Furthermore, contacting surfaces are at a maximum in proportion as the constituent grains fit together and are pressed into close contact. Such close packing of particles likewise entails but slight later shrinkage to obtain a given low porosity of finished ware. Certain aluminous materials, particularly those resulting from dehydration of hydrated alumina, such as diaspore, bauxite, and alumina hydrates, are very porous, and the pores of such very refractory materials do not close down except at very high heat treatments. The result of this is that they are not fully shrunk in manufacture and continue to shrink in use. I may, hence, prefer to aid low porosity of my product by subjecting it to pressures that crush the structures of porous materials contained therein and render them substantially non-porous, during the shaping of the ware. By the use of my size grading and grain crushing pressures, I can obtain porosities of the raw unfired body of anywhere from 5% to 10%. I may also prefer to render alumina relatively nono-porous by chemical means, such as converting it into an acid-element compound hereof, as by the use of a sulfate, a fluoride or a chloride, and then decomposing the alumina-acid-element compound to alumina. The resulting alumina consists of non-porous crystals of corundum. In addition to obtaining non-porous alumina, I thus also obtain small grain sizes of corundum free from contamination which would be introduced by grinding. Depending upon variation in the speed of formation of this corundum and the acid element from which it is formed, I can vary its grain size from approximately 0.25 micron to 5.0 microns. I may utilize my above-mentioned grading and pressing applications in accomplishing the above dense type of body.

Many refractories are destroyed during service, by slag penetrating their pores. Using my method of bonding refractories, it is possible to have interstitial bonds of such character that they coat the inside of the pores and lower the tendency of a given type of slag to enter the pores of a given refractory. Furthermore, I may provide interstitial materials of such character that they form compositions with the active components of the entering slag which retard further progress of the slag into the pores. Chromite, chrome and chrome-alumina solid solution in alumina tank blocks tend to lessen the tendency for commercial glass and glass ingredients to so penetrate the block.

It will be understood that the refractories treated according to my invention may be composed of the usual materials graded, mixed and shaped in conventional manner and by either pressing or casting operations, and thereafter dried preparatory to firing, it being understood also that the body will contain bond-developing ingredients, as heretofore explained. One manner of excluding water vapor from contact with the bond developer is by firing the dried refractory shape in an air tight chamber, to the usual firing temperature of cone 14, more or less. The furnace or the shell chamber thereof may suitably be of relatively pure iron, which will serve to a degree to retain the heated gases therein, because it not only resists their chemical action, but can easily be made air tight. The iron shell will preferably be lined with an insulating material to prevent deformation thereof under firing temperatures and loss of heat. The firing chamber can be heated by electrical resistors within or outside of the chamber; by exothermic reactions therein; by the use of heated gases either internally or externally thereof, etc. Also, the heating can be electrically by passing the current through the ware and using the ware as an electrical resistor. Furthermore, the heating can be accomplished by replacing or partially replacing the chamber atmospheres with new hot atmospheres.

Fluorine-containing atmospheres can be generated by passing the hot kiln gases through fluorine-containing compounds before they pass to the ware; by placing fluorine-containing ware between and surrounding other ware; and by firing fluorine-containing ware distributed among the other ware in a rotary kiln and in a tunnel kiln. In the latter instance, the fluorine-containing gases which escape from the ware wherein they are produced, are caused to flow to the cooler ware which is being heated, and eventually the fluorine may be recovered by conventional methods, and by absorption thereof by ammonia, lime and other basic substances.

The heat of exothermic reaction may be provided within the chamber through the reaction of the exothermic elements, either exteriorly of the ware or within the ware.

As an example of the employment of exothermic heating, I wet ram between tuyères in the bottom of a Bessemer furnace a composition which contains topaz 1% to 15%; clay (plastic bonding) 15%; metallic aluminum 2% to 5%; kyanite 65% to 72%—of the dry weight of the mix. After ramming, the furnace is heated to about 625° C., at which temperature the aluminum takes fire and takes oxygen from its surroundings, thus generating so much heat that it liberates fluorine from the topaz, and thereby also supplements the usual furnace heat and develops bond in the refractory mass.

The following is one means of providing a specific atmosphere for my processing chamber. The particular atmosphere is one of carbon monoxide, free of moisture and containing nitrogen. Such atmosphere is produced by passing dry air through red hot coke. To suitably control the chamber temperature, part of the chamber contents can be recirculated. This recirculated portion can be passed through a heat exchanger, and then can be dehydrated and otherwise rejuvenated, following which it may be returned to the chamber, any fraction of it being first repassed through the bed of red hot coke. The exchange heat may be utilized in connection with the process as need be; for instance, it may be desirable to use it at least in part as cascade heating surrounding the chamber.

During firing, permanent expansion and weight changes of the common refractory materials occur in accordance with their temperatures and are relatively rapid, their speeds of reaction being increased, by rise of temperature above their threshold temperatures. Weight losses are accompanied by decrease in bulk-specific-gravity. Permanent expansions and other decreases in bulk-specific-gravity tend to cause ware to be undesirably friable. Although bond developers tend to draw the grains of a refractory together with resultant increase in bulk-specific-gravity (decrease in porosity), their action tends to be slow and gradual, and is thwarted in proportion as the mass becomes expanded and friable. It is therefore advantageous to maintain the common refractories but slightly above such threshold temperatures for sufficient periods of time to permit bonding, drawing together of the particles thereof. This procedure is particularly useful in the firing of silica brick. I accomplish this as follows:

Although it is not common practice, measurement of the "settle of a kiln," that is, the shrinkage of the ware during firing, is well known. Furthermore, although it is not common practice, weighing of a piece of ware during the early stages of firing to determine its dryness is known. In connection with the "principle of mass action" heretofore referred to, I may prefer more or less continuously to measure the expansion and contraction of ware during firing and to synchronize the firing temperature and composition of the atmosphere therwith as by means of templates or gauge plates with which the ends of pantographs have engagement. I may do this throughout any desired portion of the firing and cooling operation. Furthermore, I may prefer similarly and simultaneously to synchronize temperature control with a more or less continuous weighing device. I may prefer not only to maintain the weighing device through the drying range, but also through dehydration ranges and through other physical and chemical changes involving weight change.

To summarize somewhat the practice of my invention, it comprises the use with the common refractory materials, of bond-forming materials, including silicon, aluminum, magnesium, iron chromium, boron and its oxides, and bond developers (acid-forming elements), the bond developers being retained as need be in the refractory by the use of chemical retainers which include suitable vapor pressures of the acid-forming elements in non-oxidizing atmospheres, or ammonium compounds of the acid-forming elements, or a combination of such pressures and compounds, during at least part of the firing and heating. The bond-forming materials and bond developers are commonly introduced as chemical compounds of the refractory materials. If, during heating, the specific bond developers are sufficiently involatile and resistant to decomposition by water vapor, oxidation and otherwise; very little or no other precaution need be taken to prevent their escape. The refractory-acid-element containing substances that are not appreciably hydrolized or otherwise decomposed below red heat are such materials. In proportion as they tend to escape, however, provision is made to retain them, this being accomplished by means of the chemical retainers referred to, or enclosure in suitable firing chambers as described. Magnesium fluoride melts at 1396° C. and can thus be used as temporary magnesium bond with magnesian grains for use as refractories in open-hearth furnaces.

In practicing my bonding method, I contemplate using those bond-developing materials in which the developing agent is held rather tenaciously, thus not requiring special chemical retainers or enclosures. Such materials are topaz, aluminum borate, boron carbide, boron nitride, magnesium ammonium fluoride, magnesium fluoride. Topaz is alumino-silico-fluoride, whose composition can be expressed as $2Al_2F_3 \cdot 3SiF_4$. This material has the advantages that it contains alumina in rather large percentage, which, by suitable processing, can be retained in the final product as corundum, and silica in lesser percentage, which silica can be made to serve largely as glassy bond.

There is evidence which indicates that on heating topaz in the presence of water vapor, the OH of the water directly replaces fluorine, and that the freed fluorine combines with the released hydrogen forming hydrofluoric acid. At still higher temperatures, this hydrated material is dehydrated to silicon and aluminum oxides. This, then, is apparently an analogous case to that mentioned above of the decomposition of magnesium chloride on being heated in the presence of water vapor.

I improve the effectiveness of the fluorine by using the topaz as a component in bodies with refractory materials with which its fluorine content is reactive, such as free alumina or free silica, or both. I may use the topaz finely ground, thus increasing its dissemination through the mass of other materials and increasing its contacting surface therewith, although such mechanical contacting is not very effective, as shown in recent tests by Lin and Taylor at Pennsylvania State College on silica. On the other hand, I make the fluorine effective by maintaining it in the ware at temperatures at which it would otherwise escape. I do this by absence of water vapor, by presence of carbon and fluorine vapor, such as from elemental fluorine, or either, and by suitable fluorine-bearing compounds such as ammonium fluoride. I may, however, prefer to use the topaz as rather coarse grains. Topaz-containing refractory material that is largely alumina, on being fired by natural gas in ordinary down draft kilns, begins to lose its fluorine rapidly at approximately 1260° C. (cone 8); the escaping fluorine being substantially all off at approximately 1388° C. which corresponds to approximately cone 14 in ordinary procedure of firing down draft kilns. On being similarly calcined, relatively pure topaz actively loses its fluorine content at cone 03, and the fluorine is substantially all off at cone 14.

Some typical examples of compositions which I employ are as follows, it being understood that the bodies containing the enumerated materials are first wet by the use of sufficient water to permit shaping thereof and are then dried and fired. (Percentages named herein refer to dry weight of the mix.)

Example 1

| | Per cent by weight |
|---|---|
| Dehydrated alumina | 75 to 98 |
| Topaz (raw rock) | 25 to 2 |

Example 2

| | Per cent by weight |
|---|---|
| Siliceous clay, 82% SiO$_2$ | 80 to 98 |
| Topaz (raw rock) | 10 to 1 |
| Aluminum borate (2Al$_2$O$_3$B$_2$O$_3$) | 10 to 1 |

Example 3

| | Per cent by weight |
|---|---|
| [1]Dehydrated alumina | 75 to 98 |
| [1]Topaz (raw rock) | 20 to 1 |
| Magnesium fluoride (MgF$_2$) | 5 to 1 |

Example 4

| | Per cent by weight |
|---|---|
| [1]Dehydrated alumina | 55 to 97 |
| [1]Topaz (raw rock) | 15 to 1 |
| Aluminum borate (2Al$_2$O$_3$B$_2$O$_3$) | 25 to 1 |
| Aluminum metal powder | 5 to 1 |

In Example 1, the silica of the topaz serves as glassy bond in which crystallization can take place during firing, while the silicon fluoride and/or fluorine coming from the topaz as it does at a temperature at which it can serve as a bond developer, is active on both the silicon and aluminum present and serves to develop bond in the mix before escaping from it. Auxiliary fluorine content may be supplied by a fluorine content in the atmosphere as required.

In Example 2, the situation is similar to that in Example 1, with the additional feature that the boron content of the aluminum borate also becomes available at elevated temperatures at which it can be effective in developing bond. Under the conditions existing in such a mix while it is being fired, boron fluoride is supposedly formed.

In silica glass and the highly siliceous eutectic glass of silica-alumina compositions, the effect of boron in improving resistance to thermal shock is supposedly akin to polymerization of the silica. Carbon resembles silicon and boron in many of its properties. It is a known fact that boron fluoride (BF$_3$) is a polymizer of many carbon compounds. My experience to date indicates that boron fluoride does form under such firing conditions and that it aids in production of interstitial bond of such character that silica containing refractories are made more resistant to heat shock than they otherwise would be.

In Example 3, the situation is similar to that in Example 1 with the additional feature of introducing a magnesium content, which content serves in developing bond and remains in the refractory after firing. Although magnesia lowers the refractoriness of silica-alumina refractories, it has a favorable effect in increasing the resistance of the alumina content to thermal shock.

In Example 4, the situation is similar to that in Example 2, with the additional feature that metallic aluminum at elevated temperatures reacts with the acid-forming elements, including fluorine and boron, liberating heat, and in turn, when permitted to do so, the aluminum of these compounds oxidizes, by means of hydrolysis of the compounds with liberation of additional heat. The total heat per gram of aluminum oxidized is very great, and its attraction for oxygen is so great that at elevated temperatures it actually takes oxygen away from silica, so that silicon and not aluminum is the later material in obtaining a full quota of oxygen.

Another example of silica-alumina raw batches is as follows:

Example 5

| | Per cent |
|---|---|
| [1]Topaz, calcined (by firing to cone 13), 4 mesh to fines | 3 to 22 |
| [1]Topaz, calcined, 48 mesh to fines | 30 to 31 |
| [1]Raw topaz, 4 mesh to fines | 20 to 22 |
| Plastic clay | 10 to 3 |

As another example, I may choose to use a more reactive material than the topaz. Thus, in Examples 1 and 5, I may replace the raw topaz in whole or in part by aluminum-borate or magnesium-fluoride, or both. On being heated, these two materials react, forming boron fluoride, magnesium borate and aluminum fluoride with liberation of some heat. It is of course desirable that there be sufficient siliceous and/or other auxiliary refractory material present to serve as matrix, so that the resultant product will be bonded together instead of falling apart as grains of powder. I may use a percentage of aluminum borate 3Al$_2$O$_3$B$_2$O$_3$ (melting point approx. 1650° C.), such that in relation to the amount of fluorine present only part of the aluminum borate will be decomposed. Aluminum fluoride (Al$_2$F$_6$) normally forms from dehydrated alumina and a fluoride gas at temperatures between 400° C. and approximately 700° C. Above this latter temperature the aluminum fluoride begins to volatilize rapidly. The attacking of the surface of the aluminum borate particles by the fluoride in the presence of interstitial glass should serve to bond any remaining aluminum borate with the balance of the body. Magnesium fluoride MgF$_2$ is insoluble in water. It melts at 1396° C. and does not decompose readily when calcined in presence of oxygen. It crystallizes from a refractory glass in the form of long needle-like crystals. Mag-

---

([1] Size graded per gradation curve $y = x^3$.)

nesia and boron on being fused together form magnesium diborate (2MgO₂B₃O) and magnesium tetraborate (3MgO.2B₂O₃). On cooling, the former forms elongated crystals, and the latter prismatic ones. Magnesium borate is not very refractory. I may, hence, prefer to maintain little if any of it in the finished refractory ware. I can accomplish its removal on account of the fact that it is slowly decomposed at high temperatures in the presence of water vapor, the B₂O₃ content passing off while the magnesium oxide remains behind in the glass or combines with alumina to form spinel, MgO.Al₂O₃ (M. P. 2135° C.) and/or magnesium-aluminum-silicate (cordierite) 2MgO.2Al₂O₃.5SiO₂ (M. P. approx. 1545° C.), with possibly a trace of solution remaining to as low a temperature as 1362° C. Cordierite serves as an excellent bonding material. It imparts low thermal expansion and toughness to alumina ware containing it. It is not, however, very refractory. Hence I commonly prefer to maintain little if any of this material in the finished refractory ware.

As an example of a refractory made from this type of batch, I may obtain a body that is largely corundum, Al₂O₃ (M. P. 2040° C.), and possibly a little aluminum-borate, bonded by a small amount of interstitial glass shot through with magnesia-alumina spinel (MgO.Al₂O₃). Minor ingredients may be aluminum-fluoride (Al₂F₆), magnesium-aluminum-silicate (cordierite $$2MgO.2Al_2O_3.5SiO_2)$$

magnesium-borate and at least part of their reaction products serving as the glassy bond, and a suitable retaining agent will be employed. The following example recites a suitable batch.

Example 6

| | Per cent by weight |
|---|---|
| Dehydrated alumina | 80 to 60 |
| Hydrated alumina | 1 to 10 |
| Magnesium fluoride | 1 to 5 |
| Aluminum silicate (clay) | 3 to 10 |
| Aluminum borate | 10 to 3 |

Passing now to still another example, I may use agents that easily volatilize off unless retained, and provide retaining agents as required. Thus, I may prefer to replace the topaz in whole or in part by materials such as aluminum-fluo-borate, aluminum-silico-fluoride, and/or magnesium-ammonium-borate. In addition to, and/or in place of, the above-enumerated retaining agents, I may specifically prefer to use carbon tetrafluoride, ammonium fluo borate, boron fluoride, ammonium fluoride and/or ammonium-borate as retaining agents. These substances, like the boron fluoride mentioned above, should be particularly useful for this purpose, as both ions of each of them actively attack the refractory materials under the conditions hereof, and develop bond. A typical batch may be:

Example 7

| | Per cent by weight |
|---|---|
| Dehydrated alumina | 78 |
| Hydrated alumina | 5 |
| Aluminum fluo borate | 10 |
| Ammonium fluoride | 2 |
| Ammonium borate | 2 |
| Aluminum silicate (clay) | 3 |

It is commonly known chemistry that many of the chemical reactions of the type involved in my process are strongly exothermic. Some of them are so exothermic that if used in proper proportions and the reactions be suitably started, they automatically go to completion. I utilize this exothermic property for forming ware in place, providing that the escaping heat can do no harm to the surroundings. I may also prefer to use this exothermic property in firing in cases where furnaces are not available for firing the ware. In the case of ware formed in place, I prefer to use compositions which exhibit little or no shrinkage from the process, or which expand. In this case, as in other applications of my process, I may prefer to use raw batch materials which retain their boron and fluorine contents rather tenaciously and which are relatively insoluble in water. (See specific example of exothermic heating heretofore recited.)

As an example of a magnesian refractory, I may start with highly magnesian materials such as periclase, plus light calcined magnesia, and add thereto a small amount of a siliceous material and aluminum-borate (these two serving to form glassy matrix in which the other materials may crystallize), and magnesium-fluoride. The processing of this batch is by the same retaining agents as noted above.

Another batch may be:

Example 8

| | Per cent |
|---|---|
| Dead burned magnesite containing some silica | 82 |
| Brucite (magnesium hydrate) | 1 to 15 |
| Aluminum borate | 1 to 10 |
| Magnesium fluoride | 1 to 5 |

In this example the magnesium fluoride should serve as a "chief" bond developer over a rather wide temperature range. Boron fluoride is probably formed. While boron remains in the ware, it is active in rendering the silica content resistant to thermal shock, part of the boron probably remains in the dry siliceous glassy bond if such be present. The alumina content released as it is in molecular sizes and in presence of active bond developing molten solution, should go into solid solution with the magnesia and possibly also form alumina-magnesia spinel. I may also prefer to use a content of magnesium ammonium fluorides (MgF₃NH₄ and MgF₂(NH₄)₂).

My use of magnesium fluoride MgF₂ is new so far as I know as a bond and bond developer in magnesia refractories, particularly when used with dead burned magnesia and periclase. It has a specific function in magnesia refractories in that its fluorine content burns so slowly from the mass which it temporarily bonds that the magnesia which it releases has time to unite with other materials of the mass such as alumina and form magnesia lumina spinel MgO.Al₂O₃ (M. P. 2135°) which is exceedingly refractory, instead of merely being released as a dry powder which would not serve as bond. This reaction can take place even though the silica content of the refractory be low.

Furthermore, I improve this specific spinel forming property of magnesium fluoride in non-shrinking magnesia and periclase refractories by the simultaneous use of an aluminum borate content 3Al₂O₃.B₂O₃ with the magnesium fluoride. The chemical reactions hereof are explained elsewhere herein.

The result of my use of magnesium fluoride and aluminum borate with magnesium fluoride in conjunction with dead burned magnesite and/or periclase in a batch mixture in which the silica content is controlled to a low percentage permits production of a fired magnesia refractory which should withstand load at high furnace temperatures and be resistant to thermal shock in proportion as it is permitted to contain materials of the cordierite composition.

As an example of a chromium-containing refractory, I may start with rather pure chromite, $FeO.Cr_2O_3$, although I may prefer to have some replacement of FeO by MgO, and of $Cr_2O_3$ by $Al_2O_3$, the auxiliary constituents being a slight amount of silica and/or boron or boron oxide to serve as glass in which the other ingredients can crystallize. To this I may prefer to add chromium and magnesium contents, or either, to reinforce the rigidity of the bond in the finished ware, and a fluorine content which may be introduced as such and/or in suitable combination. The processing of this batch is by a suitable retaining agent as noted above.

Example 9

| | Per cent by weight |
|---|---|
| Chromite (some replacement of FeO by MgO and of $Cr_2O_3$ by $Al_2O_3$ and silica) | 82 |
| Magnesium borate | 4 |
| Magnesium fluoride | 4 |
| Magnesia (as brucite) | 10 |

The above examples have been largely in connection with the one bond developing agent, fluorine. In the last above example, I may prefer to substitute sulfur in whole and/or in part for fluorine as the bond developing agent. This is done on account of the fact that sulfur is very effective on iron and its compounds. Since, however, sulfur-iron compounds are not desirable in the finished refractory, I may prefer slowly to remove the sulfur after it has served its useful purpose. This may be done as by oxidation and/or replacement by one of the other bond developers or auxiliary refractory materials. The halogens are particularly effective in replacing sulfur, and the resulting action is exothermic. Oxidation of the resulting halogen compound is also exothermic. By use of these two steps an appreciable amount of the heat required for processing arises from the reactions thereof. Fluorine and fluorides are effective for this purpose.

As an example of the benefits derived from combined grading according to my $y=x^3$ curve, and pressing at previously unused high pressures, of materials of two degrees of resistance to crushing, I give the following:

Example 10

| Lbs. pressure under 29" vacuum | Percent porosity | | Percent volume firing shrinkage |
|---|---|---|---|
| | Raw | Fired | |
| 0 | 35.6 | 22.0 | 18.53 |
| 50,000 | 18.3 | 4.8 | 5.68 |

Silica, topaz, $2Al_2O_3.B_2O_3$, and clay were size graded from approximately 100 mesh downward to approximate my $y=x^3$ curve, were slip cast to prove that they were approximately so graded. The mix was dry pressed at 50,000 pounds per square inch in a vacuum equivalent to 29 inches of mercury, and were fired in a commercial kiln to cone 13. The batch mixture was designed to yield 81.0 per cent silica in the fired condition and consisted of:

Example 11

| | Percent |
|---|---|
| Cryptocrystalline silica graded to approximate $y=x^3$ curve from through 325 mesh to less than 1 micron | 39 |
| Tennessee ball clay No. 5 | 13 |
| Tennessee ball clay No. 4 | 4 |
| South Caroline secondary kaolin | 4 |
| Brewer mine pure topaz, 90% minus 325 mesh and graded to minus 1 micron | 15 |
| $2Al_2O_3.B_2O_3$ graded in size from approx. 100 mesh downward | 25 |

If barometric pressure is below 29.5, I use a vacuum within .5 inch of the barometer.

Silica ordinarily expands on firing. At zero pressure my bond developers caused the body as a whole to contract. That contraction was so large, however (18.53 per cent by volume), that ware made of it would be apt to warp in firing. On the other hand, 50,000 lbs. pressure per square inch in a vacuum brought the particles so much closer to one another that reaction between particles has been more thorough and resulted in greatly reducing the porosity of the mass (to 4.8 per cent). Starting with such low porosity raw material, however, the firing shrinkage has been so low (5.68 per cent) that ware made of this body would show little tendency to warp in firing.

Magnesian materials which contain lime would be useful in the bottoms of open-hearth steel furnaces if the individual grains would remain in bonded condition instead of crumbling to powder on exposure to air. The crumbling is brought about through slaking of the lime content. Such lime-containing magnesian materials can properly be classed as magnesian refractories. Dolomite, which consists of one molecule of lime to one molecule of magnesia, is such a magnesian material, as are also materials both richer and poorer in lime. Lime can be converted into calcium carbide ($CaC_2$) in the presence of magnesia, without converting the magnesia into a carbide. The reaction is carried on by heating carbon in the presence of the lime at temperatures of the order of 1360° C. to 1600° C. Calcium carbide containing appreciable quantities of magnesia has, however, not been made, for the reason that its magnesia content has been an undesired ingredient for previous uses to which calcium carbide has been put. It is also known that calcium carbide can be converted into calcium cyanide ($CaCN_2$) by suitably heating the carbide in the presence of nitrogen, in the neighborhood of 1100° C. to 1300° C. Here again, calcium cyanide high in magnesia has not been manufactured because the magnesia is an undesired ingredient for its former uses. Calcium cyanide is much more inert toward water vapor than is calcium oxide. Thus by cyaniding the calcium content of magnesian grains, I not only form a tenacious bond therein, but also one which will not slake readily, and which will soften sufficiently at the temperature of the open-hearth so that the grains will suitably agglomerate and make a monolithic mass in place in the furnace.

In magnesium grain as now used in the bottoms of open-hearth steel furnaces, lime is present merely because it occurs associated with the magnesia in nature. Lime, however, may be useful in the open-hearth and since my process makes the lime non-objectionable, it may, as desired actually be added to magnesian materials in the preparation of magnesian grain for this purpose. Magnesian limes and dolomites frequently contain some iron. In addition, iron oxide to the extent of 5 to 10 per cent of the weight of the made grain is frequently added to such magnesian materials. As noted above, dolomite and magnesian materials of lower and higher lime content serve as my raw magnesian material from which to make the cyanided grain either with or without added iron.

I claim as my invention:

1. The method of making a magnesian refractory, which comprises mixing with a composition that is mainly of magnesia, magnesium ammonium fluoride in quantity only sufficient to form a bond and perform a bonding function, forming a body from the mixture and firing the same to a point at which it becomes bonded.

2. The method of making a magnesian refractory, which comprises mixing with a composition that is mainly of magnesia, magnesium fluoride, magnesium ammonium fluoride in quantity only sufficient to form a bond and perform a bonding function, forming a body from the mixture and firing the same to a point at which it becomes bonded.

3. The method of making a shock-resistant magnesian refractory, which comprises mixing with a composition that is mainly magnesia, magnesium fluoride and aluminum borate (2Al$_2$O$_3$B$_2$O$_3$)

in quantity only sufficient to form a bond and perform a bonding function, forming a body of the mixture and firing the same.

4. The method of making a shock-resistant magnesian refractory, which comprises mixing with a composition that is mainly magnesia, magnesium fluoride and aluminum borate (2Al$_2$O$_3$B$_2$O$_3$)

in quantity only sufficient to form a bond and perform a bonding function, forming a body of the mixture and firing the same, while maintaining a fluorine and boron content in the body, to a point at which there is reaction and bond forming between the fluorides and the refractory constituents of the body, the fluorides being present in quantity only sufficient to form a bond and perform a bonding function.

5. The method of preparing refractory bond that will not slake, in magnesian refractories that contain calcium, which comprises starting with a body composed of a mixture of calcined magnesian grains which contain calcium and carbon, and maintaining the said body in a dry atmosphere of carbon monoxide while firing the body, to the point at which the calcium present is converted to calcium carbide (CaC$_2$), then replacing the dry carbon monoxide atmosphere by a dry atmosphere of nitrogen, and maintaining at suitable temperature until the calcium carbide is converted to calcium cyanamid (CaCN$_2$) and the portions of magnesian material are internally bonded.

6. The method of preparing refractory bond that will not slake, in magnesian refractories that contain calcium, which comprises starting with a body composed of a mixture of magnesian grains which contain calcium, and carbon, and maintaining the said body in a dry atmosphere of carbon monoxide and another acid-forming element gaseous compound while firing the body, without addition of other fluxes, to the point at which the calcium present is converted to calcium carbide (CaC$_2$), then replacing the dry carbon monoxide atmosphere by a dry atmosphere of nitrogen and an acid-forming gaseous compound, and maintaining at suitable temperature until the calcium carbide is converted to calcium cyanamid (CaCN$_2$) and the portions of magnesian material are internally bonded.

7. The method of preparing refractory bond that will not slake, in magnesian refractories that contain calcium, which comprises starting with a body composed of a mixture of magnesian grains which contain calcium, and carbon, and maintaining the said body in a dry atmosphere of carbon monoxide having a substantial fluorine content, while firing the body, without the addition of other fluxes, to the point at which the calcium present is converted to calcium carbide (CaC$_2$), then replacing the dry carbon monoxide atmosphere by a dry atmosphere of nitrogen having a suitable fluorine content, and maintaining at suitable temperature until the calcium carbide is converted into calcium cyanamid (CaCN$_2$), any remaining calcium being combined with fluorine (CaF$_2$), and the portions of magnesian material being internally bonded.

8. The method of preparing refractory bond, that will not slake, in magnesian refractories that contain calcium, which comprises starting with a body composed of a mixture of magnesian grains which contain calcium, and carbon, and maintaining the said body in a dry atmosphere of carbon monoxide and nitrogen while firing the body, and maintaining temperature and ratio of carbon monoxide to nitrogen such that the calcium will first become reactive to carbon and later to nitrogen, and continuing the process until substantially all of the calcium has been combined as cyanogen (CaCN$_2$).

9. The method of developing and depositing crystalline refractory bond in magnesian refractories, which comprises maintaining acid-forming elements in the body composition while firing the same, without addition of fluxes other than the said acid-forming elements, to a point at which there is reaction between the acid-forming elements and refractory constituents of the body, the said acid-forming elements being present in the unfired body composition as acid-element magnesium compounds, and thereafter permitting escape of the acid-forming elements until not over 1.0% of any acid-forming element remains in the composition of the body.

10. The method of producing refractories from a mixture that contains a substantial quantity of silica, a more highly refractory granular material and a bonding ingredient, which comprises forming the mixture to a desired shape while exerting pressure thereon of not substantially less than 50,000 lbs. per square inch, and firing the body thus formed.

11. The method of producing refractories from a mixture that contains a substantial quantity of silica, a more highly refractory granular material and an acid-forming element, which comprises forming the mixture to a desired shape while exerting pressure thereon sufficient to crush the grains and reduce the porosity of the mass to not substantially greater than 5%, and firing the body thus formed.

12. The method of producing refractories from a mixture that contains a substantial quantity of silica, magnesia in granular form, and a bonding ingredient, which comprises forming the mixture to a desired shape while exerting pressure thereon sufficient to crush the grains and reduce the porosity of the mass to not substantially greater than 5%, and firing the body thus formed.

13. The method of forming a body of refractory material that is graded according to the $y=x^3$ curve and contains an acid-forming element in quantity only sufficient to perform a bonding function, which comprises forming the material to a desired shape while subjecting it to a vacuum of 29 inches of mercury, or within one-half inch of the barometer if it is below 29.5 inches, and while exerting pressure thereon of not substantially less than 50,000 lbs. per square inch, and thereafter firing the body thus formed to a point at which the acid element performs its bonding function.

14. The method of forming a body from one of the common refractory materials having grains of two degrees of resistance to crushing and graded according to the $y=x^3$ size grading curve, and which also contains an acid-forming element in quantity only sufficient to perform a bonding function, forming the material to a desired shape while subjecting it to a vacuum of 29 inches, or within one-half inch of the barometer if it be below 29.5 inches of mercury, and while exerting pressure thereon of not substantially less than 50,000 pounds per square inch, and firing the body thus formed to a point at which the acid element performs its bonding function.

15. The method of forming a body from one of the common refractory materials having grains of two degrees of resistance to crushing and graded according to the $y=x^3$ size grading curve, and which also contains an acid-forming element in quantity only sufficient to perform a bonding function, forming the material to a desired shape while subjecting it to a vacuum of 29 inches, or within one-half inch of the barometer if it be below 29.5 inches of mercury, and while exerting pressure thereon sufficient to crush the grain and reduce the porosity of the mass to not substantially greater than 5%, and firing the body thus formed to a point at which the acid element performs its bonding function.

16. The method of producing a magnesian refractory which comprises forming a body of magnesian grains of two degrees of resistance to crushing, graded per the $y=x^3$ size grading curve and which also contains magnesium fluoride in quantity only sufficient to form a bond and perform a bonding function, forming the mixture to a desired shape while subjecting it to a vacuum of 29 inches, or within 0.5 inch of the barometer if it be below 29.5 inches, and while exerting pressure thereon of not substantially less than 50,000 pounds per square inch, and firing the body thus formed to a point at which the magnesium fluoride performs its bonding function.

17. The method of producing a magnesian refractory which comprises forming a body of magnesian grains of two degrees of resistance to crushing, graded per the $y=x^3$ size grading curve and which also contains magnesium ammonium fluoride in quantity only sufficient to form a bond and perform a bonding function, forming the mixture to a desired shape while subjecting it to a vacuum of 29 inches, or within 0.5 inch of the barometer if it be below 29.5 inches, and while exerting pressure thereon of not substantially less than 50,000 pounds per square inch, and firing the body thus formed to a point at which the magnesium fluoride performs its bonding function.

DONALD W. ROSS.